(No Model.) 15 Sheets—Sheet 1.
R. A. BREUL.
MACHINE FOR MAKING WIRE CHAIN.
No. 467,331. Patented Jan. 19, 1892.
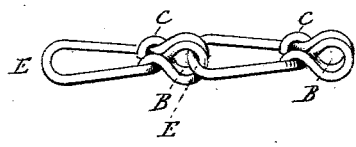
Fig. 1
Fig. 2
Fig. 3
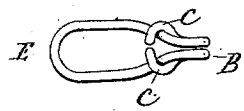
Fig. 4
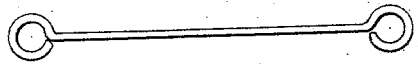
Fig. 4ª
Witnesses:
J. H. Shumway
F. W. Peer
Richard A. Breul,
Inventor,
By attys
Earle Seymour (No Model.) 15 Sheets—Sheet 2.
R. A. BREUL.
MACHINE FOR MAKING WIRE CHAIN.

No. 467,331. Patented Jan. 19, 1892.

(No Model.) 15 Sheets—Sheet 3.
R. A. BREUL.
MACHINE FOR MAKING WIRE CHAIN.

No. 467,331. Patented Jan. 19, 1892.

Witnesses
J. H. Shumway
F. W. Peek

Richard A Breul
Inventor
By attys
Earle Seymour (No Model.) 15 Sheets—Sheet 4.
R. A. BREUL.
MACHINE FOR MAKING WIRE CHAIN.
No. 467,331. Patented Jan. 19, 1892.
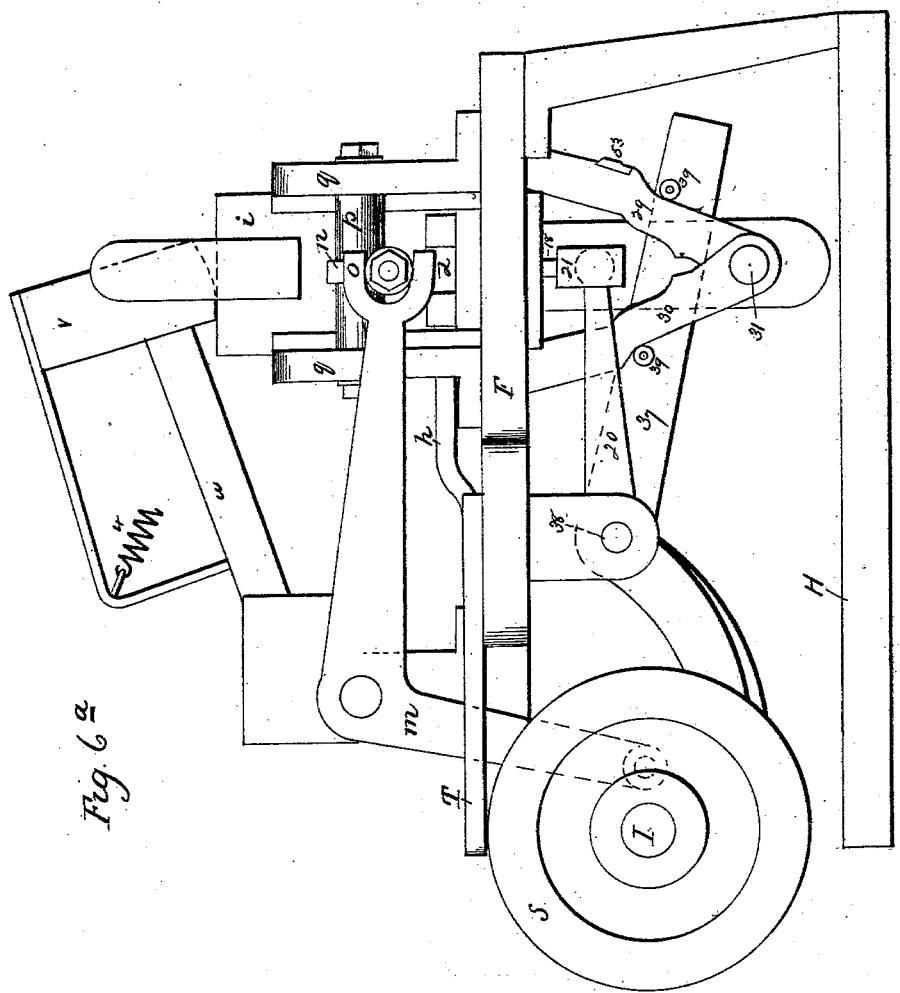
Fig. 6ª

(No Model.) 15 Sheets—Sheet 5.
R. A. BREUL.
MACHINE FOR MAKING WIRE CHAIN.
No. 467,331. Patented Jan. 19, 1892.
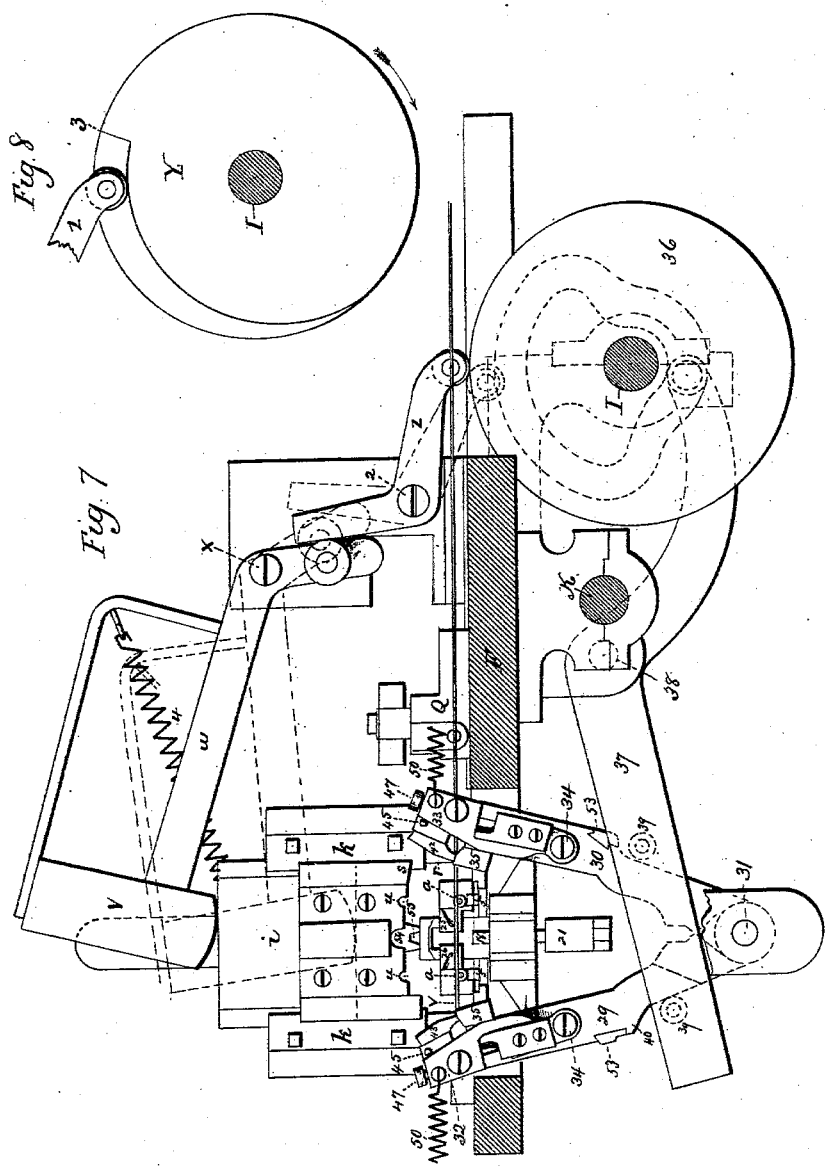

(No Model.)  15 Sheets—Sheet 6.
R. A. BREUL.
MACHINE FOR MAKING WIRE CHAIN.
No. 467,331. Patented Jan. 19, 1892.
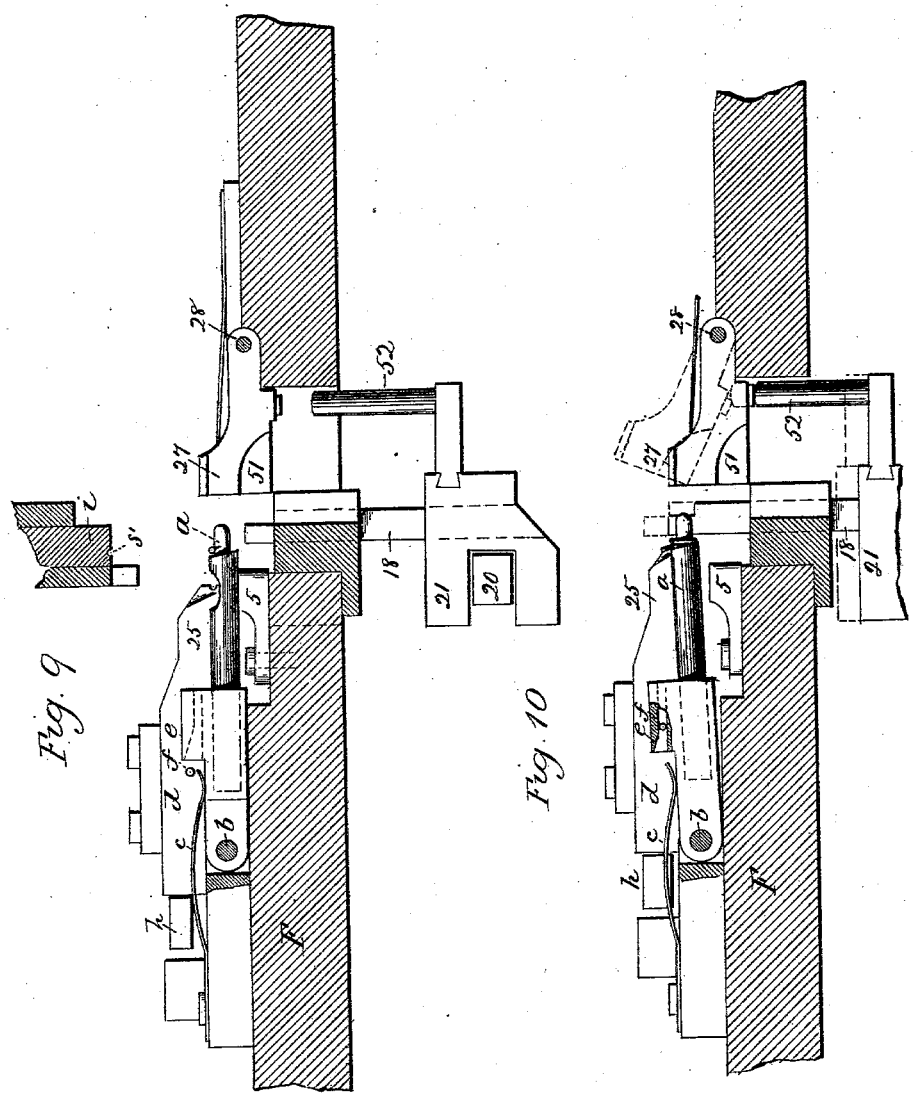

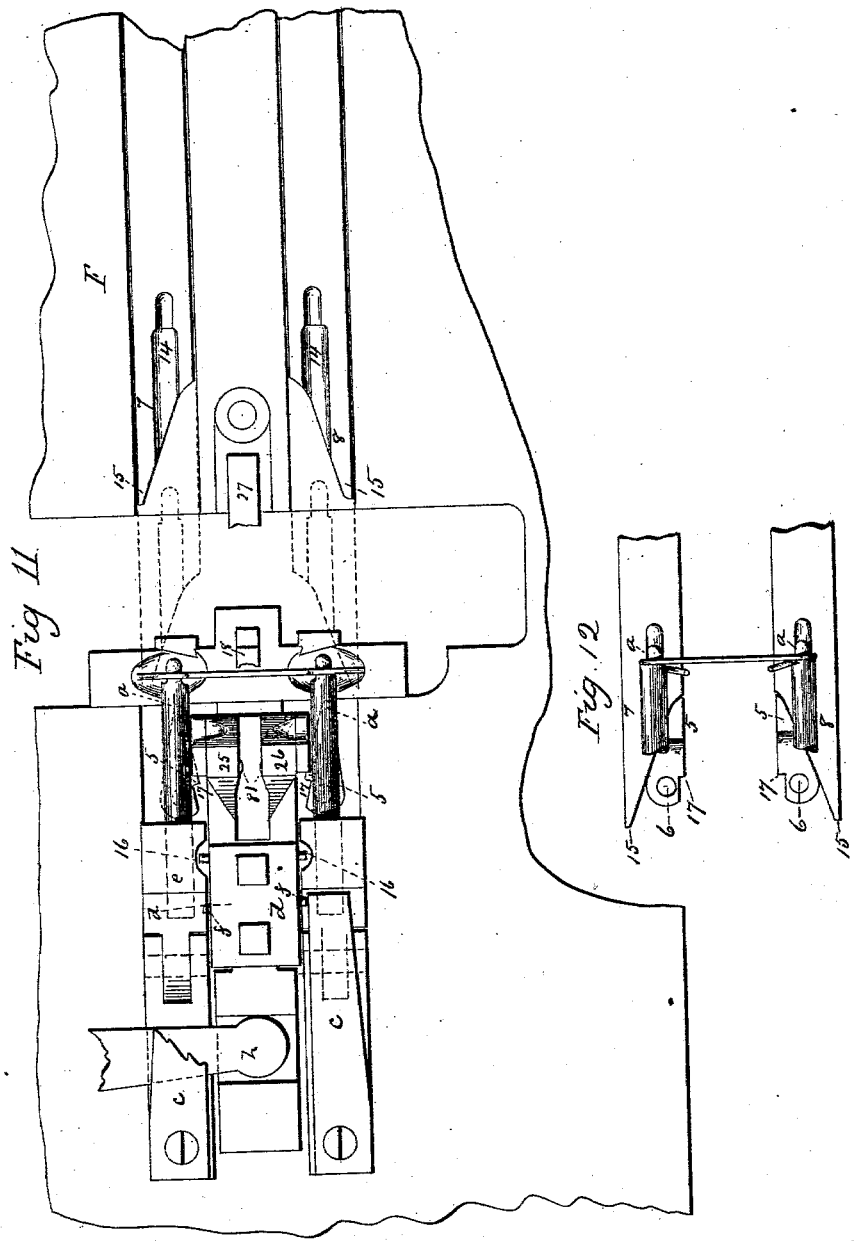

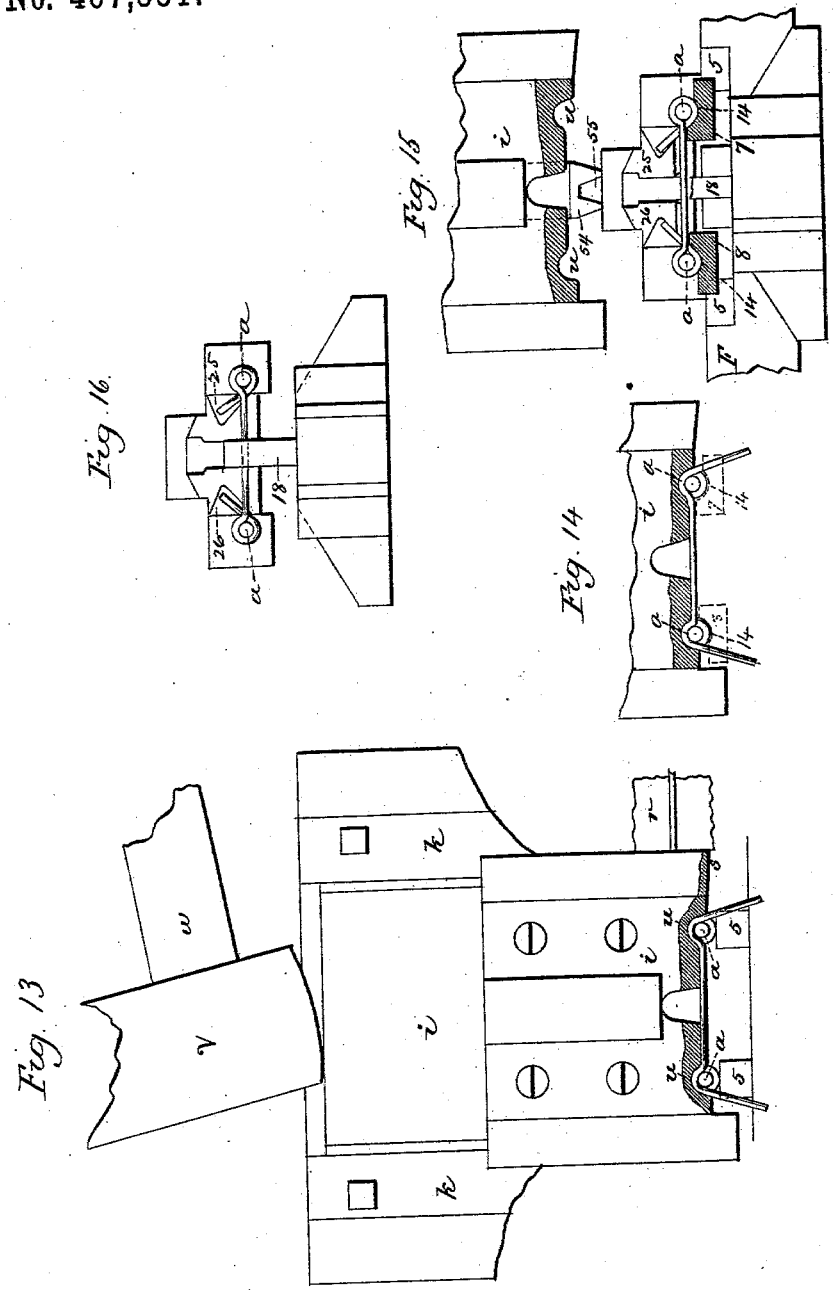

(No Model.) 15 Sheets—Sheet 9.
R. A. BREUL.
MACHINE FOR MAKING WIRE CHAIN.
No. 467,331. Patented Jan. 19, 1892.
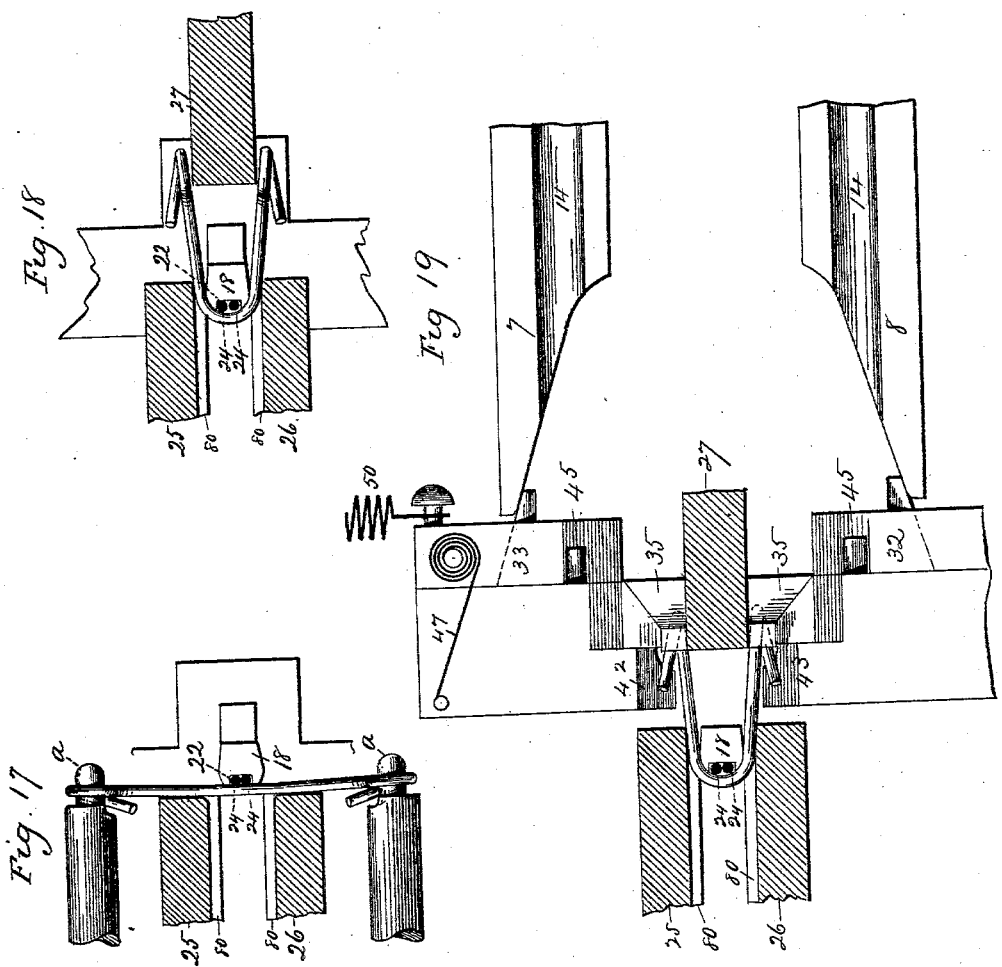

(No Model.) 15 Sheets—Sheet 10.
R. A. BREUL.
MACHINE FOR MAKING WIRE CHAIN.
No. 467,331. Patented Jan. 19, 1892.
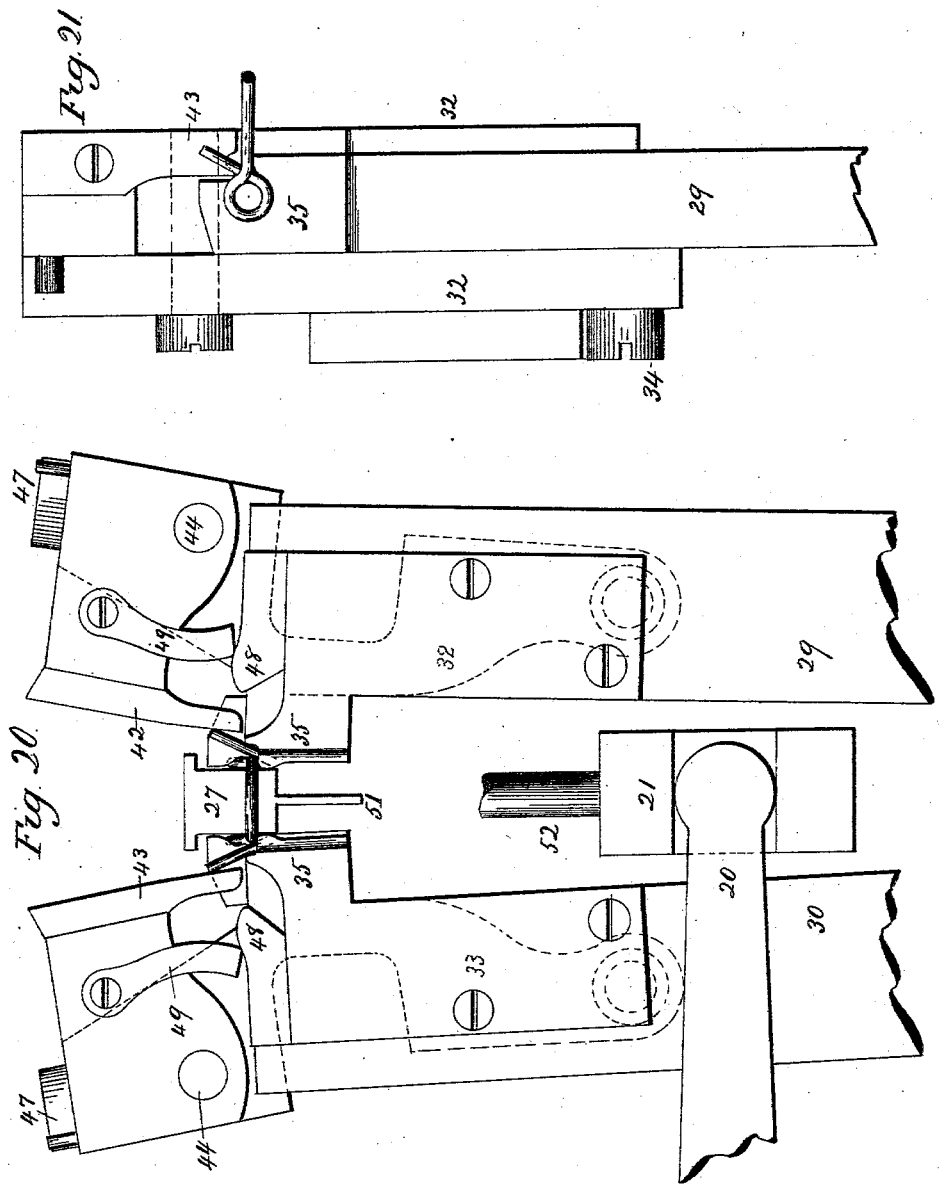

(No Model.) 15 Sheets—Sheet 11.
R. A. BREUL.
MACHINE FOR MAKING WIRE CHAIN.
No. 467,331. Patented Jan. 19, 1892.
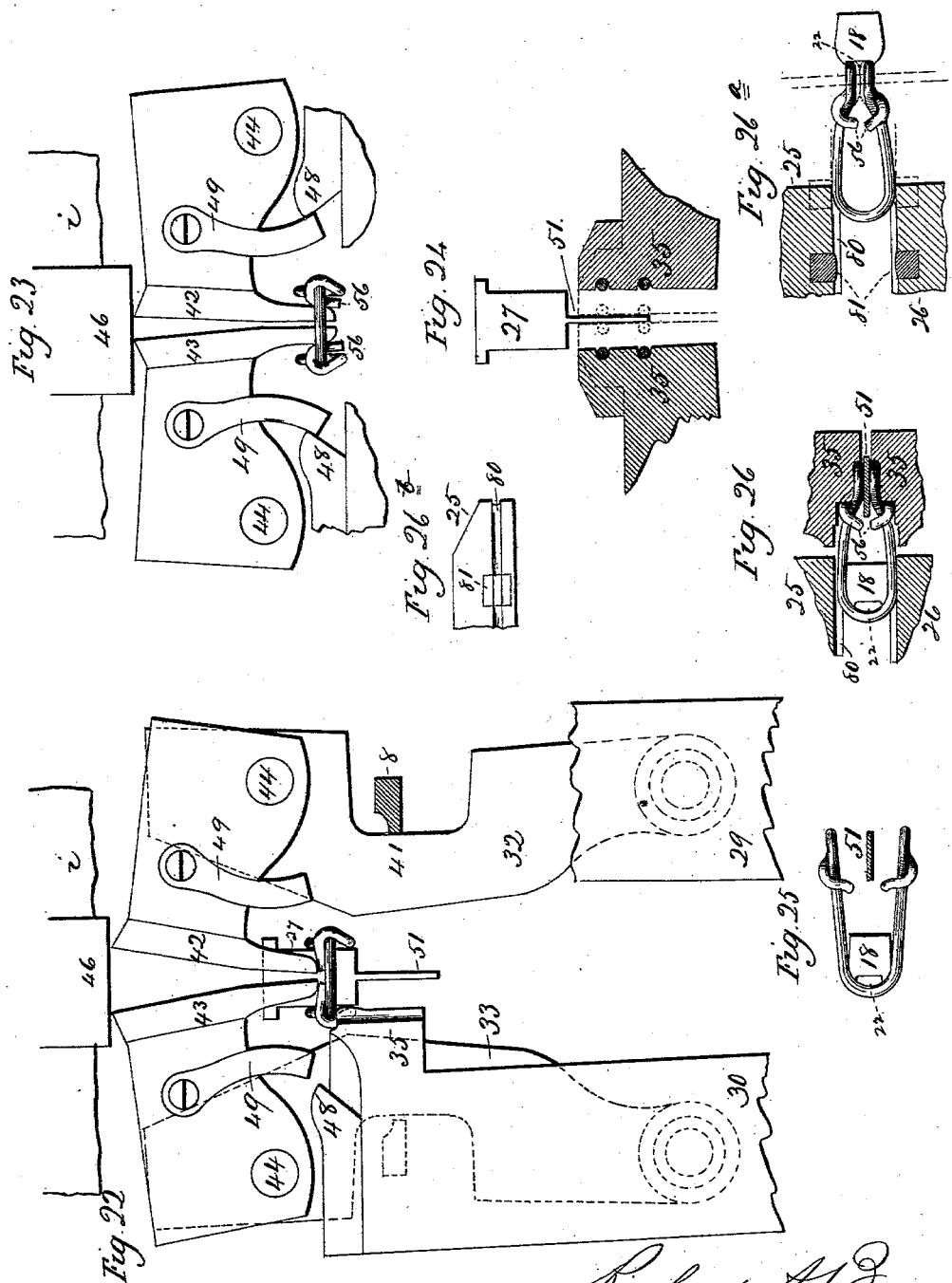
Witnesses
J. H. Shumway
F. W. Peek
Richard A. Breul
Inventor
By atty
Earle Seymour (No Model.) 15 Sheets—Sheet 12.
R. A. BREUL.
MACHINE FOR MAKING WIRE CHAIN.
No. 467,331. Patented Jan. 19, 1892.
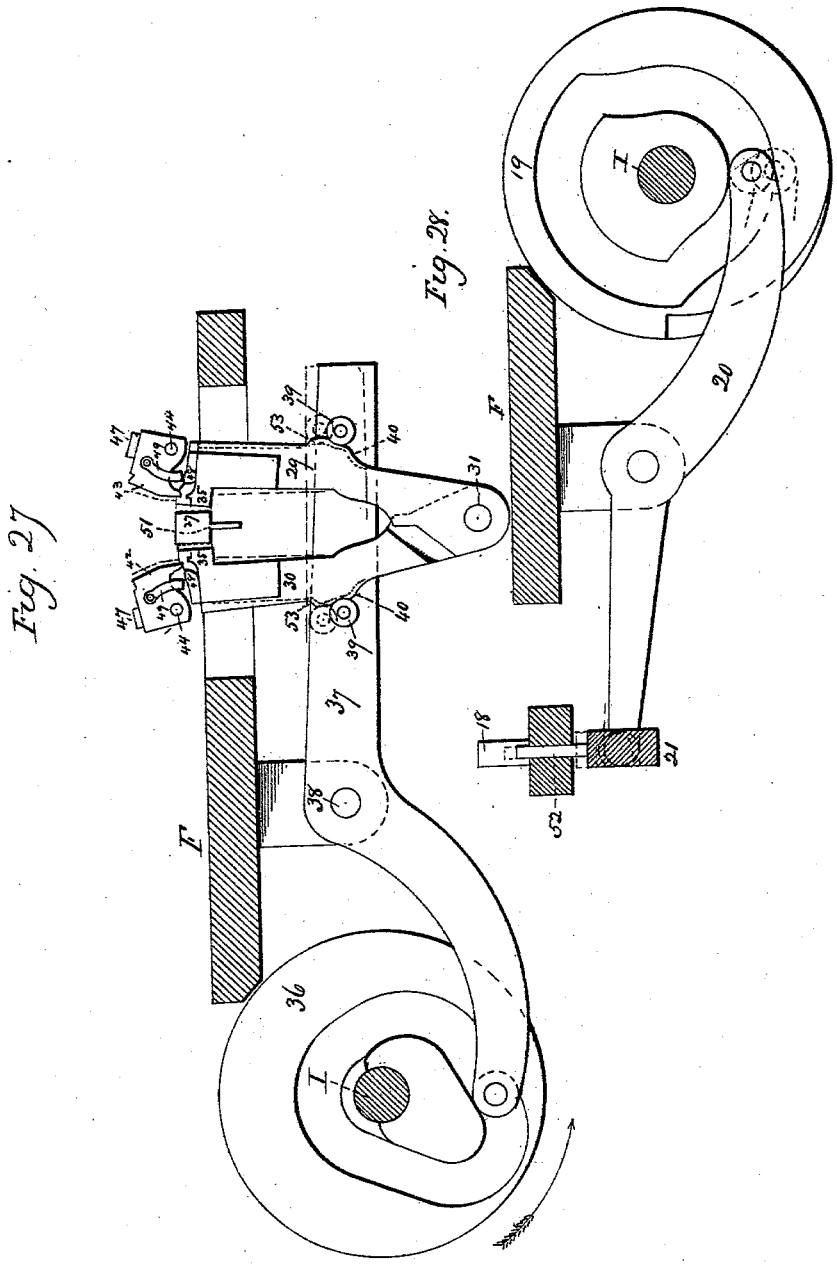

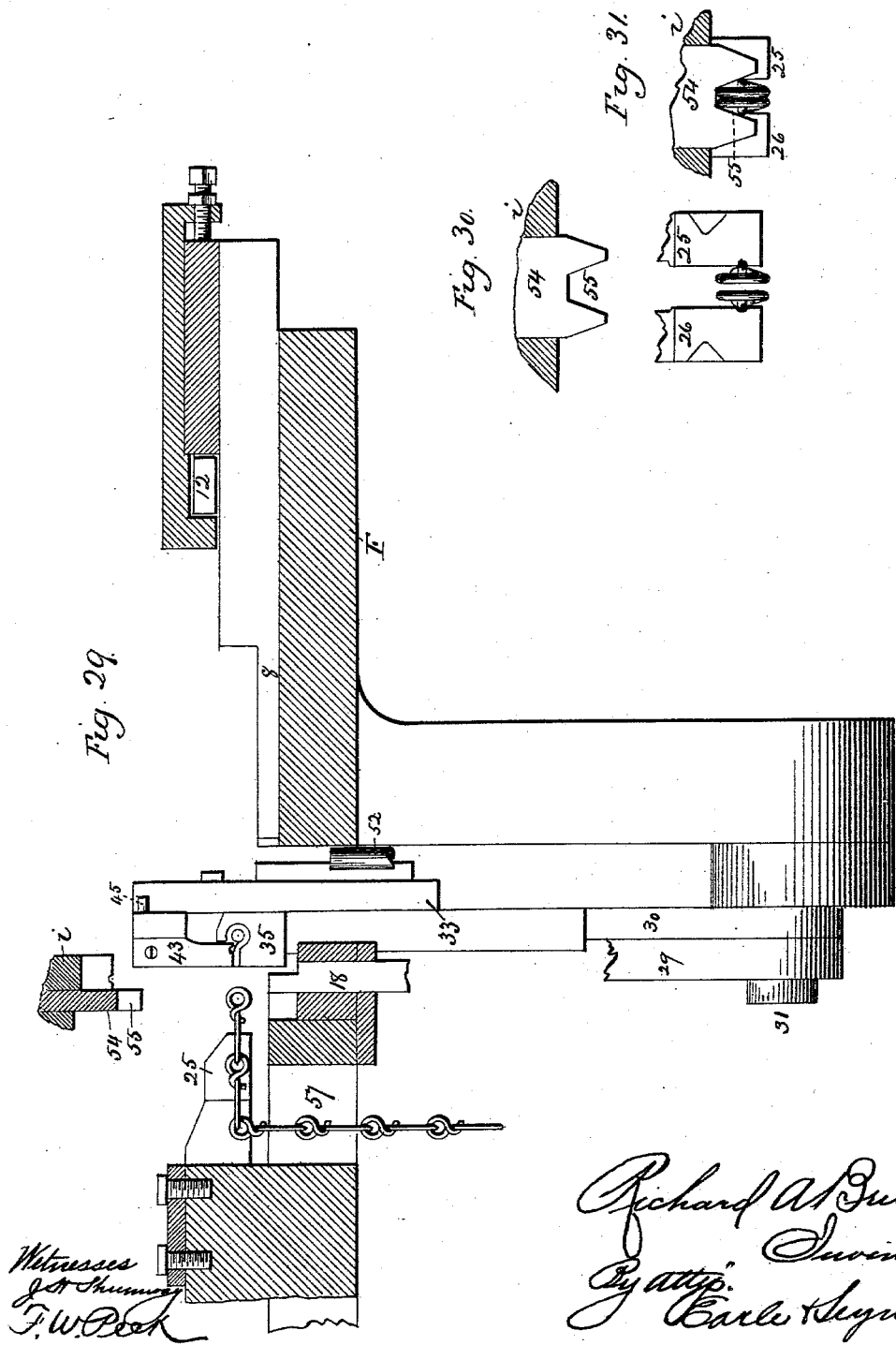

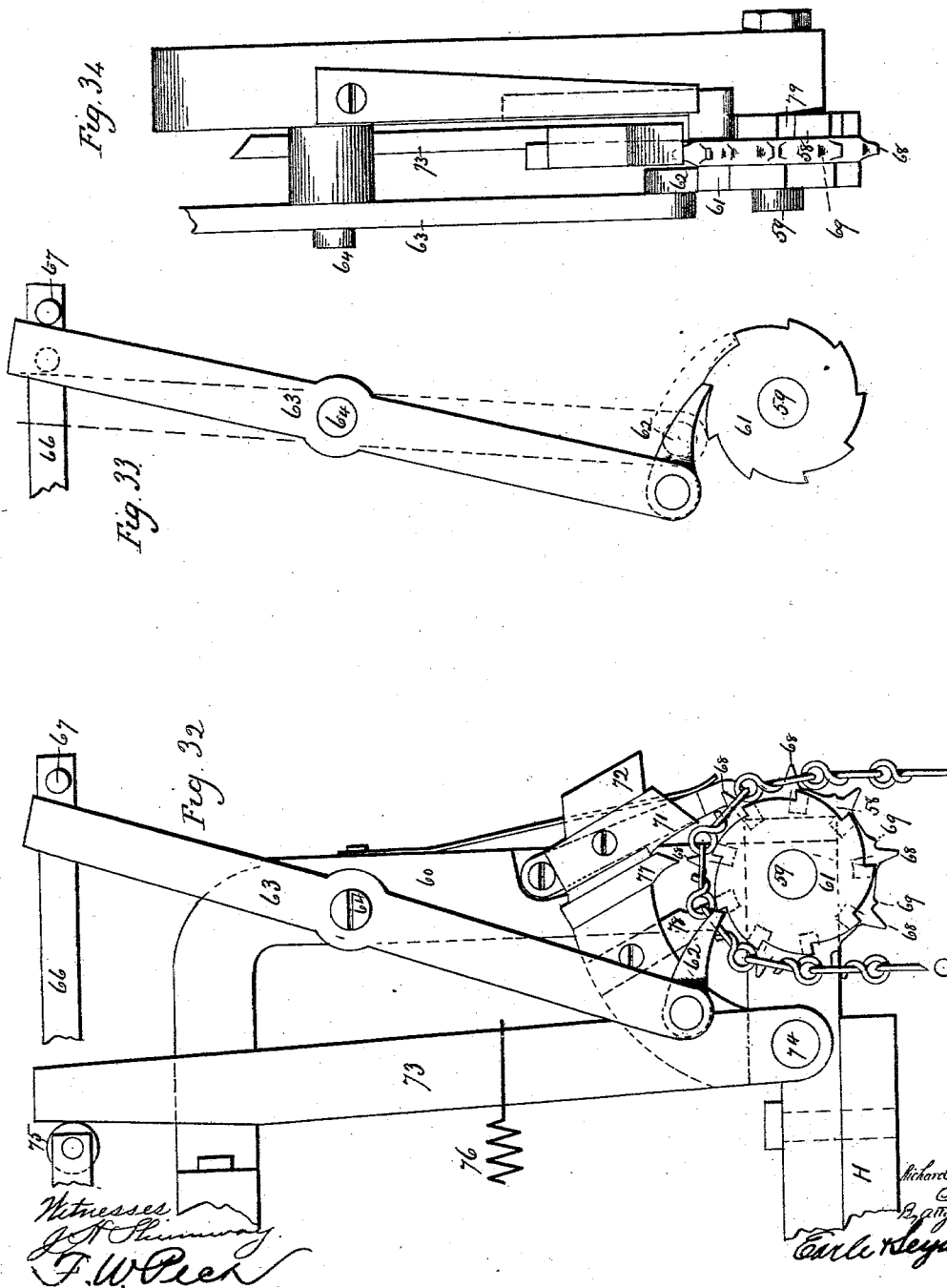

(No Model.) 15 Sheets—Sheet 15.
R. A. BREUL.
MACHINE FOR MAKING WIRE CHAIN.
No. 467,331. Patented Jan. 19, 1892.
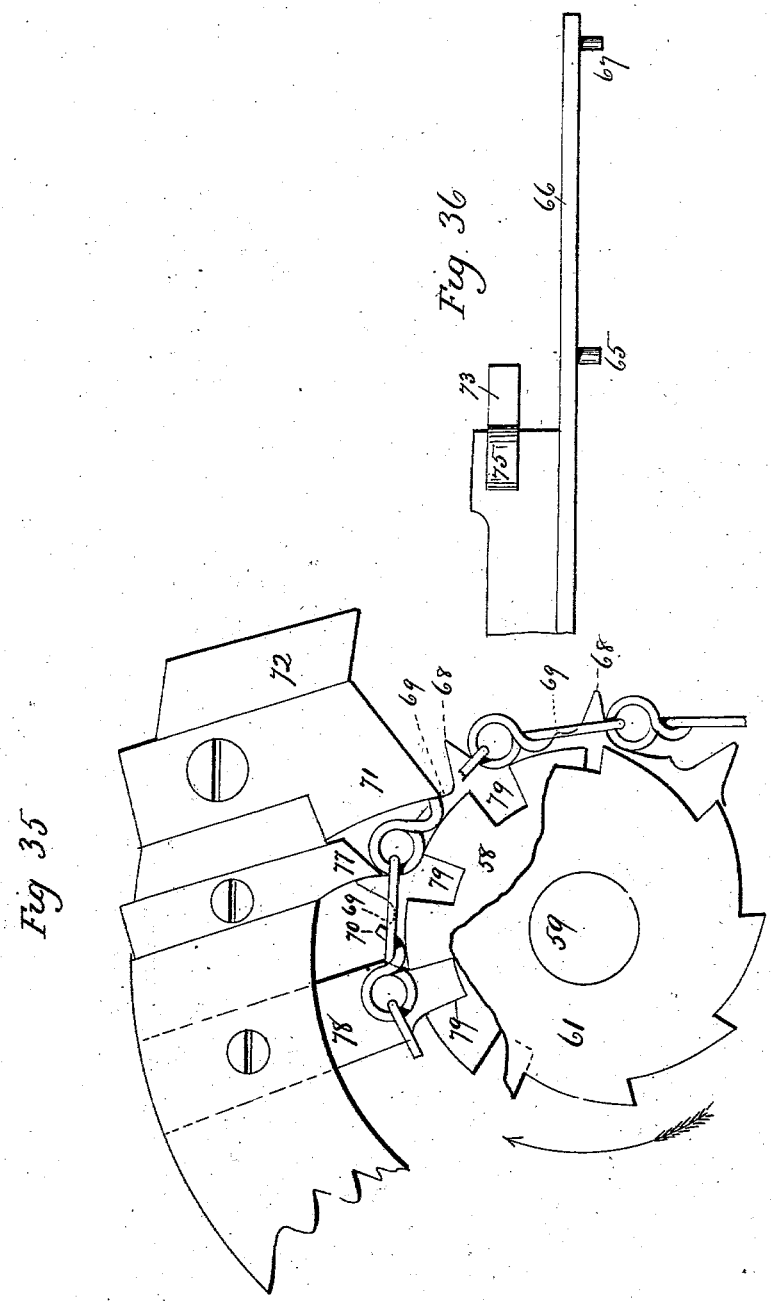

UNITED STATES PATENT OFFICE.

RICHARD A. BREUL, OF BRIDGEPORT, CONNECTICUT, ASSIGNOR TO THE BRIDGEPORT CHAIN COMPANY, OF SAME PLACE.

MACHINE FOR MAKING WIRE CHAIN.

SPECIFICATION forming part of Letters Patent No. 467,331, dated January 19, 1892.

Application filed August 31, 1891. Serial No. 404,251. (No model.)

*To all whom it may concern:*

Be it known that I, RICHARD A. BREUL, of Bridgeport, in the county of Fairfield and State of Connecticut, have invented a new Improvement in Machines for Making Wire Chain; and I do hereby declare the following, when taken in connection with accompanying drawings and the letters and figures of reference marked thereon, to be a full, clear, and exact description of the same, and which said drawings constitute part of this specification, and represent, in—

Figure 5:
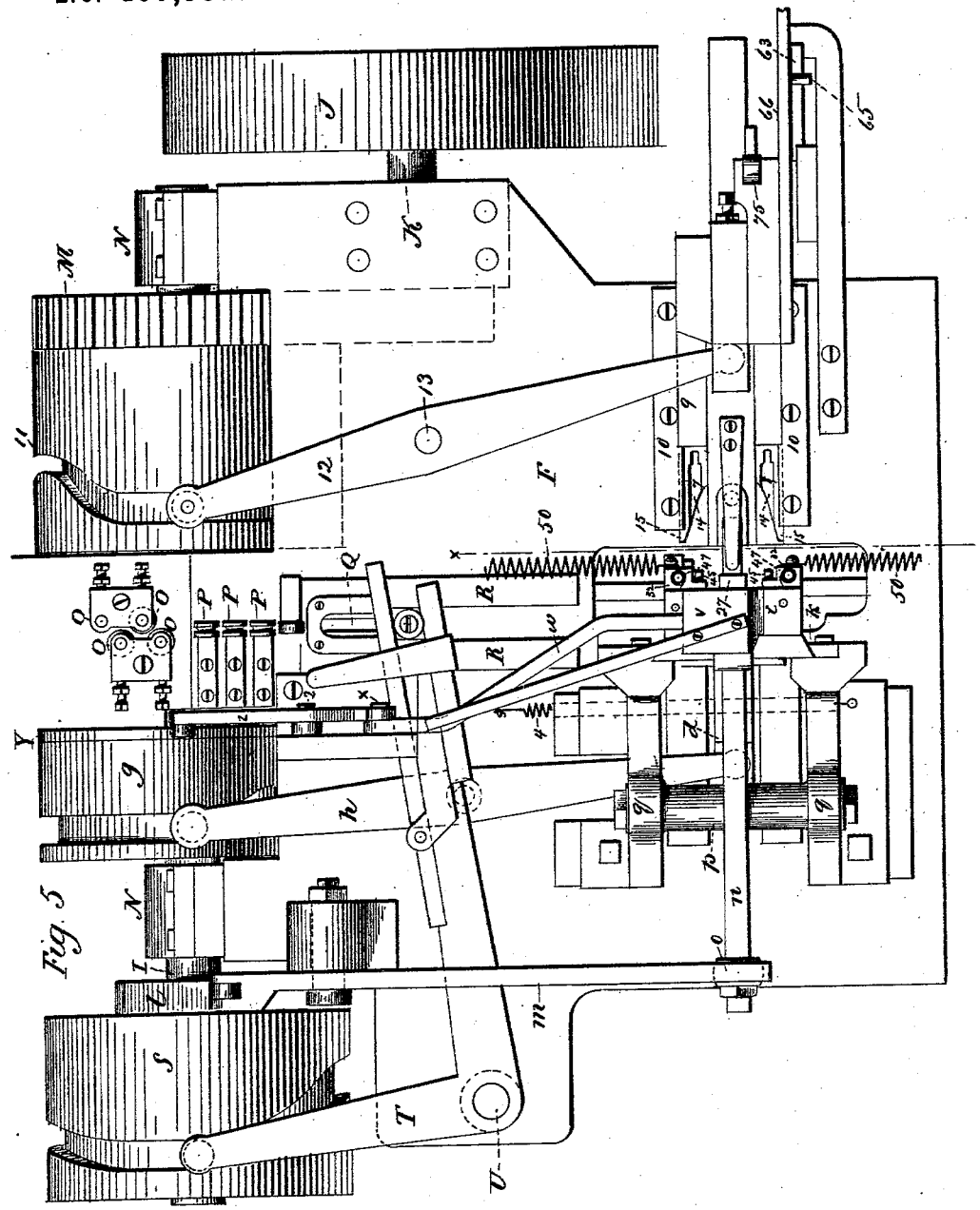
Figure 6:
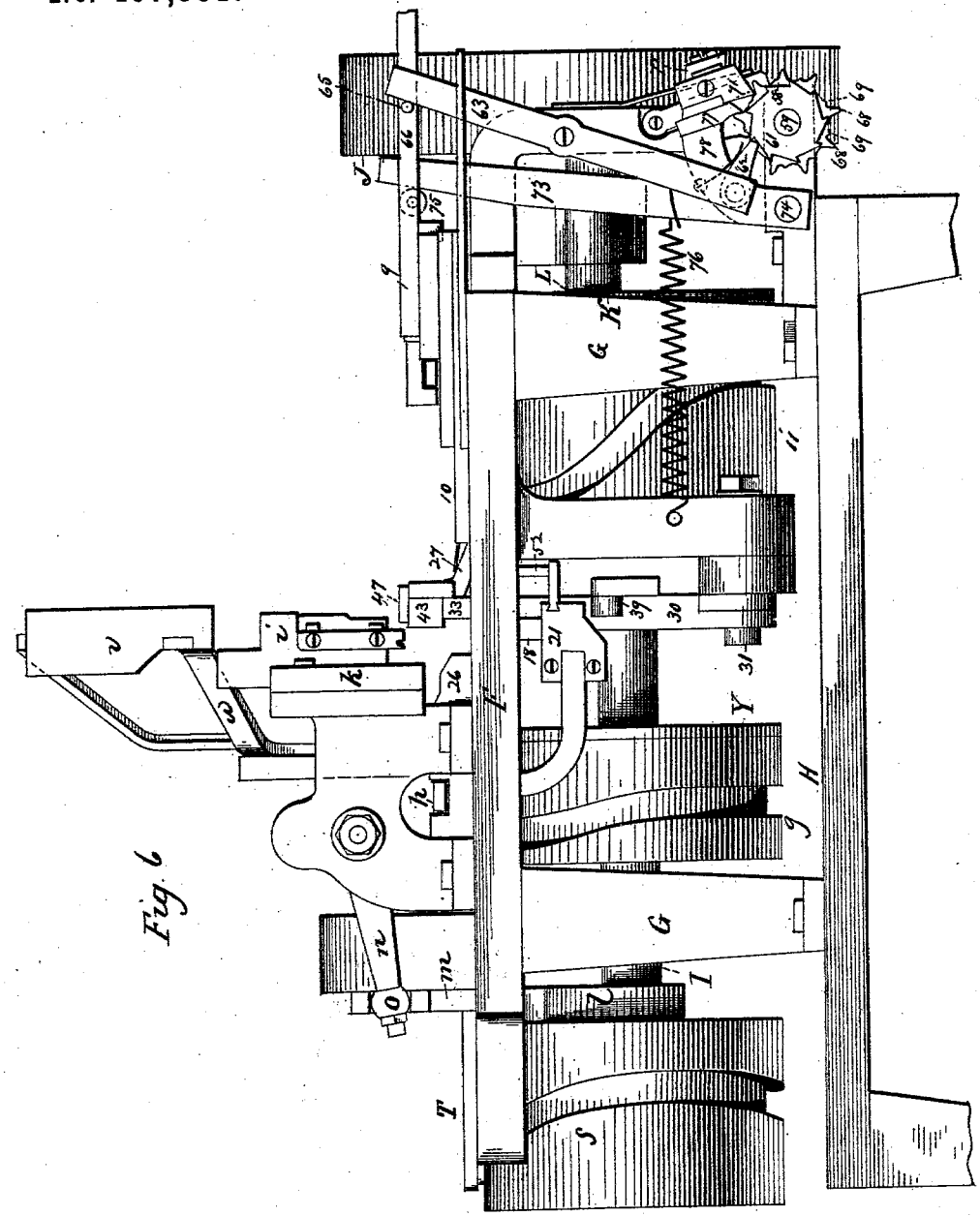

Figure 1, a perspective view of two connected links of a chain such as the machine of this invention is adapted to produce; Fig. 2, the blank having the eye formed at each end with the ends of the wire bent around the body; Fig. 3, a transverse section of the body, cutting on line $x\ x$ of Fig. 2 and looking toward the eye; Fig. 4, a plan view of the link, showing the two eyes as brought together; Fig. 4ª, a modification in the formation of the link and which the machine is adapted to produce; Fig. 5, a top or plan view of the machine complete; Fig. 6, a front view of the same; Fig. 6ª, an end view looking from the left of Fig. 6; Fig. 7, a transverse section cutting on line $x\ x$ of Fig. 5; Fig. 8, the hammer-cam $r$ detached; Fig. 9, a detached longitudinal section cutting at the side of one of the spindles, also showing a section of the vertical slide $i$ and side view of the abutment 27, the abutment being in the down position, the spindles also being in the down position; Fig. 10, the same as Fig. 9, showing the spindles in the up position and the abutment as in the up position in broken lines; Fig. 11, a detached plan view showing the spindles and the bending-fingers 7 and 8 to illustrate the operation of the said fingers in connection with the spindles as well as of the rests which support the spindles, the rests being represented as under the spindles; Fig. 12, the bending-fingers as advanced below the spindles and as having turned the rests from beneath the spindles; Fig. 13, a detached front view of the slide $i$ as having produced the bend of the blank around the spindles and showing the hammer as having imparted its blow to the slide; Fig. 14, the slide and spindle in the same position as in Fig. 13, but with the bending-fingers 7 and 8 advanced in broken lines; Fig. 15, a detached view showing the bending-fingers 7 and 8 in transverse section as having completed their work upon the wire around the spindles with the slide in the up position; Fig. 16, the same as Fig. 15, but with the fingers 7 and 8 withdrawn and as preparatory to the advance of the benders 25 and 26; Fig. 17, a transverse sectional view showing the blank as bent around the spindles, the former as presented forward of the blank, and the benders 25 and 26 just commencing their bending operation; Fig. 18, the same as Fig. 17, showing the benders as advanced and as having produced the doubling of the blank with the abutment 27 presented between the eyes; Fig. 19, a detached view representing the jaws 35 as having been brought against the eyes upon the opposite sides of the abutment 27; Fig. 20, a detached transverse elevation showing the jaws 35 as having clamped the eyes against the former with the fingers 42 and 43 about to advance; Fig. 21, a side view of the lever 30, representing a face view of the jaws 35 and of the finger 43; Fig. 22, the same as Fig. 20, representing the fingers 42 and 43 as having advanced to produce the inward bend. Fig. 23 represents the fingers as having been operated by the slide $i$ to produce the downward bend of the ends of the wire; Fig. 24, a transverse section through the jaws 35, showing the abutment 27 in the raised position; Fig. 25, the blank as bent around the former, with the two eyes standing upon opposite sides of the blade 51 as when the abutment is in the up position; Fig. 26, the same as Fig. 25, with the jaws 35 brought forward to force the eyes upon opposite sides of the blade 51. Fig. 26ª represents the benders 25 and 26 as having retreated with a link and presented the same in rear of the former 18, also showing the setting-cheeks 81; Fig. 26ᵇ, an inside view of the jaw 35, showing the setting-cheek 81; Fig. 27, a detached transverse section illustrating the operation of the levers 29 and 30; Fig. 28, a detached view to illustrate the cam which brings the former into action and also gives to the abutment its up-and-down movement; Fig. 29, a partial longitudinal central section showing face view of the lever 29 and also of the lever 33 hung thereto, with face view of the jaw 35, and bending-finger 43, with the parts in the position as presenting the eyes of a formed link to receive the next blank; Figs. 30 and 31, detached views illustrating the operation of the setter 54; Fig. 32, a detached side view of the cutting mechanism, showing the cutter 71 in the retreated position; Fig. 33, a side view of the ratchet and its operating-lever by which intermittent rotation is imparted to the cutting-wheel; Fig. 34, a front view of the cutting mechanism; Fig. 35, a detached view of the cutting-wheel in partial section to illustrate the operation of the cutter, the cutter being shown as having just completed its work; Fig. 36, a top view of that portion of the slide 9 by which the cutting mechanism is operated; Figs. 13 to 35, inclusive, enlarged for convenience of illustration.

This invention relates to the construction of a machine for automatically manufacturing wire chain, it being specially adapted for the manufacture of the chain for which Letters Patent of the United States No. 359,054 were granted to this inventor March 8, 1887. Two connected links of this chain are represented in Fig. 1.

In the manufacture of the chain each link is made from a blank of wire, the blank A of the wire being bent to form an eye B at each end in the same plane, and to interlock the ends of the wire with the body the wire is of sufficient length that after forming the eyes the ends may be carried over on one side of the body, as at C, and then returned upon the opposite side of the body, as at D. (See Figs. 2 and 3.) Then the blank is doubled at the center in a plane at right angles to the plane of the eyes and so as to bring the two eyes together to form one end of the link, as seen in Fig. 4, while the bend E will form the other end of the link, the blank for the next link being passed through the eyes thus brought together and then in like manner bent to form the eyes and bring the two eyes together to receive the third link.

The object of this invention is the construction of a machine which will automatically produce this chain; and it consists in the combination of mechanisms, as hereinafter described, and particularly recited in the claims.

F represents the bed of the machine, which supports the operative mechanism. As here represented, this bed is provided with legs G, which rest upon a table H.

I represents the driving-shaft, to which power is communicated through a pulley J on a counter-shaft K, the shaft K carrying a pinion L, which works into a corresponding gear M on the driving-shaft I. The method of communicating power to the driving-shaft, however, is immaterial to the invention. The driving-shaft is located at the rear of the machine and supported in suitable bearings N.

The wire from which the chain is to be made is introduced at the rear of the machine through straightening devices, here represented as consisting of two series of grooved rollers O, arranged to revolve upon vertical axes and between which the wires may pass, and a second set of similar rollers P, arranged to revolve upon horizontal axes and between which the wire will pass after having run through between the rollers O O. This straightening mechanism is a common and well-known device and for which other straightening devices may be substituted, or the straightening devices may be omitted entirely should the nature of the wire be such as not to require a straightening operation before it passes into the machine.

The wire is fed into the machine by an intermittent movement to present the required length for each link. As here represented, the feeding device is one of common construction, and consists of a clamp Q, arranged between suitable guides R and so as to reciprocate freely therein, the slide being operated from a cam S on the driving-shaft through a bell-crank lever T, hung upon a pivot U on the bed and so as to swing in a horizontal plane parallel with the path of movement of the clamp. This clamp is adapted to open as it retreats and close as it advances, and so that as it commences its advance it will grasp the wire with sufficient force to draw the wire into the machine, and then as it commences its retreat will release the grasp upon the wire and return without effect upon the wire. This being a common and well-known feeding device does not require detailed illustration, and instead of this feeding device other known feeding devices may be substituted. The shape and timing of the cam S is such that the wire advances at the proper time and to the proper extent to introduce a length of wire sufficient for the production of a single link at each operation of the feed.

In Fig. 7 the wire is represented as run into the machine to the required extent, and preparatory to cutting off the required length for a single link V, Fig. 7, represents the wire thus presented to the position where it is to be cut off and preparatory to the first bending. The wire thus coming into the machine passes over a pair of spindles $a$ $a$, (see Fig. 7,) these spindles being distant from each other, according to the position of the eyes required to be bent near the ends of the blank, and of a size and shape corresponding to the interior of such eyes. These spindles are hung to the bed upon pivots $b$, so that they may swing up and down in a vertical plane, as from the position in Fig. 9 to that in Fig. 10 and return, and they are provided with springs $c$, the tendency of which is to hold the spindles in the down or normal position, as seen in Fig. 9. The upward-swinging movement is imparted to the spindles by means of a slide $d$, arranged in suitable guides and reciprocating in a path parallel with the spindles, the spindles carrying a cam $e$ and the slide $d$ carrying a stud $f$, which as the slide advances from the position seen in Fig. 9 to that seen in Fig. 10 will strike the cam $e$, and thereby cause the spindles to rise from the position seen in Fig. 9 to that seen in Fig. 10, and then as the slide $d$ returns the stud $f$ will pass from the cam $e$ and leave the spindles free for reaction of the spring $c$ to bring them again to their normal position, as seen in Fig. 9.

The reciprocating movement is imparted to the slide $d$ by means of a grooved cam $g$ on the driving-shaft through a lever $h$. This slide $d$ performs other offices, which will be described as such offices appear in the operation of the machine.

Above the working ends of the spindles and the wire as it is presented thereon is a vertical reciprocating slide $i$, arranged in guides $k$, (see Fig. 7,) the vertical reciprocating movement being imparted thereto from a cam $l$ on the driving-shaft through a lever $m$, which vibrates in a vertical plane and which is connected to a second lever $n$ at right angles thereto, as seen in Figs. 6 and 6ª, the connection being made by a universal joint $o$. The said lever $n$ is arranged upon a shaft $p$, supported in bearings $q$, and extends into engagement with the slide $i$, so that the vertical reciprocating movement will be imparted to the said slide $i$.

The wire is led to its place through a stationary die $r$, and the slide $i$ carries upon its edge in the plane of the face of the die $r$ a cutter $s$, which as the slide descends will coact with the stationary die $r$ and cut off the length of wire which has been presented upon the spindles $a\ a$ and as seen in Fig. 13. The slide $i$ carries upon its lower face a die $t$, in which a groove $s'$ is formed (see Fig. 9) corresponding to the wire which rests upon the spindles $a$, and this groove is of a shape corresponding to about one-half of the eyes to be formed in the wire, as seen at $u$, Fig. 13, and so that as the slide $i$ completes its descent the body portion of the wire is bent down between the spindles and the end portions bent over and downward around the outside of the spindles, as seen in Fig. 13, thus making the first bend in the formation of the eyes and bringing the body of the wire into a position to stand in central line through the eyes. To give a set to this first bend, a hammer $v$ is arranged, which after the slide $i$ has descended to produce the first bend will impart a blow upon the top of the said slide, which will act as a force to set the first bend. This hammer is attached to an arm $w$, hung upon a pivot $x$, (see Fig. 7,) and so as to swing in a vertical plane over the upper end of the slide $i$. The hammer is raised by a cam Y on the driving-shaft operating through a lever $z$, hung upon a pivot 2, one of its arms arranged to work upon the cam and the other against the projecting end of the hammer-ram $w$, as seen in Fig. 7, and so that under the revolution of the cam Y the hammer will be raised and at the proper time will escape from the shoulder 3 of the cam Y, (see Fig. 8,) so as to liberate the hammer to permit it to fall upon the slide $i$, as represented in broken lines, Fig. 7, the power or force of the blow being increased by means of a spring 4, connected to the hammer. To support the spindles under the force thus produced in the first bends, rests 5 are arranged below the spindle, as seen in Figs. 11, 12, and 13, and shown in broken lines, Fig. 11. These rests are hung at the rear upon pivots 6 and so as to swing in a horizontal plane, as from the position in Fig. 11 to that seen in Fig. 12 and return, they being of a height corresponding to the space between the spindles and the bed below, and so that the spindles may lie on the said rests when in the down position and during this first bend. In the second bend the ends of the wire are turned up, as seen in Fig. 15, on one side of the body, and this bend is produced by a pair of bending-fingers 7 and 8, arranged on a slide 9, and so as to reciprocate in a path at right angles to the blank as it stands in the machine—that is, parallel with the spindles around which the first bend is made. The slide 9 is arranged in suitable guides 10 and receives its reciprocating movement from a cam 11 on the driving-shaft through a lever 12, hung upon a pivot 13 and connected with said slide. These fingers are constructed with a longitudinal groove 14 on their upper surface in line with the spindles, the shape of the groove corresponding to the circumference of the lower portion of the completed eyes, and the inner edges of the fingers diverge, so that their extreme points 15 are distant from each other somewhat greater than the distance between the downwardly-projecting ends of the first bend and so that as the fingers advance from the position in Fig. 11 to that seen in broken lines, the same figure, the diverging or inclined edges of the fingers will strike the then downwardly-projecting ends of the wire and so as to force those ends inward. The upper surface of the fingers thus passing under the spindles will throw the ends of the wire upward on one side of the body of the wire, as seen in Fig. 15, thus producing the second bend. To permit the fingers to thus pass under the spindles it is necessary to remove the rests 5. This is accomplished by the inclined inner surface of the fingers 7 and 8, operating upon the outer sides of the rests 5 as they advance beneath the spindles, and so as to turn the rests inward from the spindles, as from the position in Fig. 11 to that seen in Fig. 12, and the rests are returned after the fingers shall have retreated by means of projections 16 on the slide $d$, arranged to work against corresponding shoulders 17 upon the inner side of the rests, as seen in Fig. 11. The slide $i$ now rises, leaving the blank upon the spindles, with the ends of the wire turned upward and rearward of the body of the blank, as seen in Fig. 15.

The next operation is the doubling of the blank. For this purpose a former 18 is arranged vertically through the bed, as seen in Fig. 9, and in a position forward of the blank as it then stands on the spindles, as seen in Fig. 17. This former receives an up-and-down movement from a cam-groove 19 in the side of the cam Y on the driving-shaft through a lever 20, (see Fig. 28,) one arm of the lever engaged with the cam and the other engaged with the head 21, to which the former 18 is attached, as seen in Fig. 9, and so that in the operation of the cam the former is raised from the position seen in Fig. 9 to that seen in Fig. 10 and returned. In the upward movement the former 18 is brought into a position forward of the blank as it then stands upon the spindles, as seen in Fig. 15, the rear shape of the former corresponding substantially to the shape of the bend required for the blank; but upon the back side of the former is a recess 22, which adapts it to pass up over the eyes of the preceding link—that is to say, so that after the bend is produced the recess 22 in the former 18 will be of sufficient space for that portion of the eyes of the preceding link which stands within the bend of the link being formed, as seen in Figs. 17 and 24, representing the wire of the two eyes of the preceding link and through which the blank was introduced as it came to its position upon the spindles. The former having been thus presented forward of the blank, the slide $d$ advances, and, as before described, raises the spindles to the position seen in Fig. 10. The rising movement of the spindles is required that the eyes may be brought up into position for the next entering blank, it being remembered that in the formation of the eyes the body of the blank was depressed and out of the line of the incoming wire, so that the eyes would thus stand entirely below the line of such incoming wire; but by this raising of the spindles the blank is brought up until the body is in the same plane as the run of the wire, consequently bringing the eyes into a central position with relation to the line of the wire fed into the machine. After the spindles have been thus raised, as seen in Fig. 10, the slide $d$ still farther advances. The said slide carries in its forward end a pair of benders 25 and 26, one in a line each side of the former, as seen in Fig. 17, and as they advance they strike the blank, press it against the former, and still advancing double the blank around the former 18, as seen in Fig. 18, which brings the blank into U shape, with the two eyes forward and against an abutment 27, which is hung upon a pivot 28 in the bed forward and so that the abutment may swing in a vertical plane, as from the position seen in Fig. 9 to that seen in Fig. 10. The abutment 27 serves to hold the eyes apart, as seen in Fig. 18. At this time the turned-up ends of the wire stand outside the body of the wire and project upward. The next operation is to bend these ends inward over the body, as seen in Fig. 22, and then down inside the body, as seen in Fig. 23. The abutment 27 affords a resistance to support the eyes against such bends. A pair of levers 29 and 30 (see Fig. 7) are hung upon a central pivot 31 below the bed and so as to swing in transverse planes—that is to say, planes at right angles to the line of the spindles $a$ on which the first bend is made. These levers 29 and 30 extend upward, one upon each side of the abutment 27, as seen in Fig. 7, and as also seen in Fig. 20. On these levers 29 and 30 other levers 32 and 33 are hung upon pivots 34 and so as to swing in a plane parallel with the path of the swinging movement of the levers 29 and 30. The levers 29 and 30 each carry a jaw 35, which as the levers 29 and 30 approach each other bring the jaws 35 against the eyes then resting against the abutment 27 and so as to firmly grasp the eyes upon the respective sides of the abutment. The swinging movement is imparted to the levers 29 and 30 by means of a cam 36 on the driving-shaft through a lever 37, hung upon a pivot 38 below the bed. The forward arm of the lever is provided with studs or anti-friction rollers 39, standing, respectively, outside the levers 29 and 30, and these levers are each constructed with a cam 40, upon which the studs 39 will operate to bring the jaws 35 against the eyes, as before described—that is, to the position seen in Fig. 27 and as also seen in Fig. 20. It will be understood that the slide 9, carrying the fingers 7 and 8, has retreated immediately after they have produced the second bend and now stand back of the levers 32 and 33 in substantially their normal position. As soon as the jaws 35 have grasped the eyes, as before described, the slide 9, with the fingers 7 and 8, again advances, and their beveled inner ends strike a corresponding point 41 on the outside of the levers 32 and 33, and because of their inclined shape operate to force the levers 32 and 33 toward each other from the position seen in Fig. 20 to that seen in Fig. 22, the levers 32 and 33 being shown in Fig. 20 in broken lines.

To the upper end of the levers 32 and 33 a pair of bending-fingers 42 and 43 are hung, respectively, upon pivots 44 and so as to swing in a plane parallel with the plane of movement of the said levers 32 and 33. The fingers are each provided with a stud 45 above their pivots, (see Figs. 5 and 7,) so that the upper end of the levers to which they are hung may bear against the said studs as the levers advance, and thus give to the fingers their inward movement from the position in Fig. 20 to that seen in Fig. 22. The inward movement of the fingers thus produced bends the upwardly-projecting ends of the wire inward over the body of the wire, as seen in Fig. 22, and so that the fingers come to a position between the two branches of the body of the wire, but above the body, as seen in Fig. 22. The slide $i$ again descends, it carrying a shoulder 46, which is adapted to strike the upper ends of the fingers 42 43, as seen in Fig. 22, and impart to them a downward movement, as seen in Fig. 23, forcing the ends of the fingers with the end of the wire down between the two branches of the body, as clearly seen in Fig. 23, thus doubling the ends of the wire around their respective portions of the body of the wire and back of the eyes.

The fingers 42 and 43 are each provided with a spring 47, the tendency of which is to force the fingers forward and downward; but the path of movement of the fingers is controlled by cams 48 on the levers 29 30. The fingers are each provided with a projection 49, which rides upon the upper surface of these cams 48, the projections 49 riding over the cams, so as to rise slowly as they advance, as seen in Figs. 20 and 22, when the projections leave the cams, and so that as the slide $i$ descends these projections will pass down inside the cams 48, as seen in Fig. 23. This bend accomplished, the slide $i$ rises, permitting the fingers 42 and 43 to rise at the same time the slide 9 retreats, when the springs 50, which are attached to the levers 32 and 33, react and draw the levers 32 and 33, together with the fingers 42 and 43, rearward, the fingers rising because of the action of the cams 48 upon the projections 49 and so as to pass over those cams in opening, as seen in Fig. 20. The abutment 27 is of a width, as before described, so as to hold the eyes distant from each other, so that the bend of the ends may be made; but the abutment is reduced in thickness upon the under side, so as to form a downwardly-projecting blade 51, against which the eyes may be bent. To bring this blade 51 into position for the closing of the eyes together, the abutment is raised by means of a stud 52, projecting from the head 21, (see Figs. 9 and 10,) which as the former 18 rises is carried up to a position to bear upon the under side of the abutment 27, as seen in Fig. 10. Then after the inward turn of the ends of the wire has been produced, as before described, the head 21, with the former, is given a farther rise, which forces the abutment 27 upward, as represented in broken lines, Fig. 10, and so as to present the thin blade 51 between the two eyes and as seen in Figs. 24 and 25. This accomplished, the lever 37 again operates upon the levers 29 and 30 through a second rise 53 of the cam, so as to force the jaws 35 farther inward and toward the blade 51, as represented in broken lines, Fig. 27, and as also seen in Fig. 26. This operation of the jaws 35, as seen in Fig. 26, closes the eyes upon the blade 51 and brings them into planes parallel with each other and in a position close together. (Also represented in broken lines, Fig. 24.) This last bend accomplished, the jaws 35 recede, the former 18 drops, the benders 25 and 26 hold the completed link by frictional contact between them, and those benders then recede, taking the link which has been thus formed rearward and so as to bring the eyes of the link thus formed into line with the incoming wire, as seen in Fig. 29, and so that when the next run of wire is introduced it will pass through those eyes onto the spindles $a$, as before, when the second link will be bent and completed like the first and presented for the next run of wire, the spindles dropping to their normal position as the slide $d$, carrying the benders, retreats, and so that the next incoming length of wire may pass above them, as first described. As a completely-formed link recedes, as before described, preparatory to receiving the wire for the next link and before the doubling of the wire of the said next link is produced, the former 18 rises to a position forward of the wire to be bent, as before described, and forward of the eyes of the precedingly-formed link, as seen in Fig. 18. The former therefore serves as a stop to prevent the advance of the said previously-formed link as the benders 25 26 advance. Consequently the said previously-formed link remains stationary while the benders advance, and so that when the jaws next retreat the next bent link will be drawn back with the advancing and precedingly-bent link toward the discharge from the machine.

The feeding of the completed links is produced by the former 18. As the benders 25 and 26 recede, they take the completed link to a position to bring the eyes immediately in rear of the position occupied by the former when it is raised, and so that when the former rises it will stand immediately forward of the eyes of this finished link. The next feed of the chain is produced by the former—that is to say, the former stands while the benders 25 and 26 advance, and as the finished link stands against that former, as seen in Fig. 26$^a$, the benders slide upon the link as they go forward to bend the wire which has been previously inserted through the eyes of the completed link, and as represented in Fig. 26$^a$, broken lines indicating the blank so introduced.

In the return of the benders after the eyes have been completely formed, as before described, and as the abutment rises there is a liability of the link to be thrown out of its proper plane, so that when it has retreated it would not stand in direct line with the former, and so that the forward side of the eyes may enter the recess in rear of the former, as before described. It is therefore desirable to provide some device whereby the link may be brought with certainty to its proper central position. To this end a centerer 54 is arranged in the under face of the slide $i$, and provided with a cavity 55, in a position corresponding to that required for the eyes of the link when in the rear position just mentioned, the cavity 55 contracts from its lower end upward, presenting two oppositely-inclined surfaces which act as cams upon the eyes, and so that as the link may have been thrown either to the right or left the inclined sides of the recess in the centerer will throw the link accordingly, and as seen in Fig. 31. At the same time the cavity in the centerer being narrower than the space occupied by the eyes of the link (see Fig. 30) will operate upon the eyes to force those eyes together as from the position seen in Fig. 30 to that seen in Fig. 31, and this position corresponds to the position of the former, so that as the benders next advance to produce the bending the jaws will slide upon the link and will bend and engage the next link, as before described.

In order to permanently set the eyes in the closed position described, and as seen in Fig. 31, the benders 25 and 26 are constructed with longitudinal grooves 80 in their face corresponding to the links produced, and as seen in Fig. 26$^b$, and in these grooves at the rear cheek-pieces 81 are set, grooved corresponding to the face of the benders, but projecting slightly therefrom, as seen in Fig. 26$^a$. These projections present a rounded surface forward, and so that as the benders advance these cheek-pieces strike the link at the bend and force the metal forward to contract it at that point which produces the setting effect required to retain the eyes in the closed position, as seen in Fig. 31.

By the operation as thus far described the links are completely formed, each successively-formed link being interlaced with the precedingly-formed link and so that the chain passes from the machine.

To facilitate the bending of the ends of the wire around the body, it is desirable that the wire should be somewhat longer than is required for the finished link, and this increased length is also desirable because of unavoidable slight variations in the bend. Consequently under such increased length the ends of the wire will project below the body to the extent of such surplus metal, as represented at 56, Fig. 23. These projections or surplus metal if not removed would detract from the otherwise finished appearance of the link. When such increased length of wire is employed, it is desirable that the surplus metal of the projecting ends of the wire should be removed. To accomplish this object a cutting apparatus is made as a part of the machine and so as to operate automatically. As the links are successively completed, the chain passes down through a suitable opening 57 in the bed, from whence it is led to a wheel 58, arranged upon a horizontal axis 59, supported in a suitable bearing 60. To this wheel an intermittent rotation is imparted by means of a ratchet 61, attached to or formed as a part thereof, operated by a pawl 62 on a lever 63, the said lever 63 hung upon a fulcrum 64 and extending upward into the path of a shoulder or stud 65, projecting from an arm 66, which is attached to the slide 9 and so as to reciprocate therewith, (see Figs. 5 and 6,) and so that as the slide 9 retreats the shoulder 65 will strike the lever 63 and draw the pawl backward, as seen in Fig. 6, and then as the slide 9 advances and at the proper time a stud or shoulder 67 on the arm 66 will strike the opposite side of the lever 63 and turn that lever, as represented in broken lines, Fig. 33, and so as to impart one step in rotation to the ratchet-wheel 61 and the wheel 58. The chain passes over the periphery of the wheel 58, as seen in Figs. 32 and 35, the wheel being provided on its periphery with prongs 68, distant from each other and of a shape corresponding to the broad end of successive links, and so that the said prongs will engage the links and under the rotation of the wheel will serve to advance the links, the steps of rotation imparted to the ratchet 61 and the wheel 58 corresponding to the length of the successive links.

Immediately back of the prongs 68 shoulders 69 are formed, which serve as rests, against which the turned-in ends of the wire will bear, as seen in Fig. 35, and so that the surplus metal will project above the said shoulders, as indicated at 70 in Fig. 35. These shoulders each serve as one of a pair of cutters or as a rest against which a reciprocating cutter may operate so as to cut off the ends of the wire.

71 represents the cutter, which is attached to an arm 72, projecting from a lever 73, hung upon a fulcrum 74, and which lever 73 extends up into the path of a shoulder or anti-friction roller 75, projecting from the slide 9, and so that as the said shoulder 75 comes against the lever 73 in the retreat of the slide 9 it will force the lever 73 forward and so as to bring the cutter 71 down onto the projecting ends of the wire, and so that working in conjunction with the shoulder 69 the said cutter will trim off the projecting ends of the wire, as represented in Fig. 35, the cutter in this operation moving from the position seen in Fig. 32 to that seen in Fig. 35, the retreat of the lever and cutter being produced by a spring 76, provided for the purpose. The arm 72 is provided with a dog 77, which as the cutting operation is produced will come to a bearing upon the eyes of the link being trimmed, as seen in Fig. 35, and so as to hold the link firmly as the projecting ends are cut off.

To lock the wheel 58 in the cutting position, and so as to better resist the action of the cutter, the lever 72 is provided with a second dog 78, the nose of which enters corresponding recesses 79 on the side of the wheel 61 opposite the ratchet. This locking of the wheel occurs before the cutting commences, and so as to insure the bringing of the wheel to the exact position for the operation of the cutter 71 with the shoulder 69. The trimming of the ends of the wire finishes the chain, and thence it passes from the machine ready for market or use, thus producing the chain complete and finished by continuous automatic operations from the reel or wire to the completed chain.

Instead of feeding the wire to the machine from the reel, the blanks may be cut to the required length and fed separately to the machine either by hand or otherwise.

In the inward bend of the ends of the wire over the body, as in Fig. 22, and then downward, as in Fig. 23, the downward bend may be omitted in some cases, the ends of the wire simply turned inward over the body, so as to interlock therewith in rear of the eyes. In such case the up-and down swinging movement of the bending-fingers 42 and 43 may be omitted; but the downward bend is preferred as giving additional strength to the chain.

While the closing of the eyes, which has been described as made upon the blade 51, is preferred, as insuring the bringing of the eyes into proper planes with relation to each other, that blade may be omitted and the eyes brought close together by the jaws 35, or the eyes may stand in the open position and the final closing of the eyes omitted; but it is preferable to employ the blade 51, as also the final setting or closing of the eyes together.

The rests 5 may be omitted, provided the spindles are of sufficient strength to resist the bending operation performed on said spindles.

The preliminary bend produced by the spindles and the slide $i$ may be made independent of the machine, so as to produce the blanks in that shape, and such blanks be threaded by hand into the eyes of the previously-formed link.

In a chain in which great strength is not required the bending-fingers 42 and 43 may be omitted, the wire being of a length simply to form complete eyes, as seen in Fig. 4ᵃ. In such case the abutment and its blade may be omitted, the jaws 35 operating to bring the eyes together after the wire has been bent around the former.

I claim—

1. In a machine for making wire chain, and in which the links are made from a blank having an eye formed in each end thereof, then bent to bring the two eyes together to form one end of the link, while the bend forms the opposite end, the next link being threaded through the said two eyes of the preceding link, the combination of a pair of spindles $a\ a$, corresponding in shape to the eyes to be formed in the blank and adapted to receive the blank, and a slide arranged to reciprocate in a plane at right angles to said spindles, its lower face constructed as a die having cavities $u\ u$ therein corresponding to substantially one-half the eyes to be formed in the blank and whereby the blank is bent to form substantially one-half of said eyes and leave the ends of the wires projecting therefrom, substantially as described.

2. In a machine for making chain substantially such as described, the combination of the spindles $a\ a$, and the fingers 7 and 8, arranged to reciprocate in paths parallel to said spindles, the forward ends of the said fingers inclined outward and forward, so that at their extreme forward end they are distant from each other greater than the distance between the said spindles, the said fingers being adapted in their advance movement to pass beneath the said spindles, the fingers grooved upon their upper surface corresponding to said spindles, substantially as described, and whereby the projecting ends of the blanks are turned inward and around the spindles to form the eyes in the blank.

3. In a machine for making chain, the combination of the reciprocating slide $i$, the spindles $a\ a$, and the swinging rests 5 5 below the said spindles with the reciprocating fingers 7 and 8, the said fingers being adapted to force said rests from below the slides as the said fingers advance, substantially as described.

4. In a machine for making chain, the combination of the spindles $a\ a$, bending devices substantially such as described, adapted to form eyes in the ends of a blank placed upon said spindles, the former 18, and the reciprocating benders 25 and 26, substantially as and for the purpose described.

5. In a machine for making wire chain substantially such as described, the combination of mechanism adapted to bend the blank wire to form an eye in each end of the blank, a former with mechanism adapted to double the wire around the said former, so as to bring the eyes into the longitudinal plane of the link; and a pair of jaws 35 35, between which the said eyes are presented, the said jaws being adapted to close the said eyes together, substantially as described.

6. In a machine for making wire-chain substantially such as described, the combination of mechanism adapted to bend the blank wire to form an eye in each end of the blank, a former with mechanism adapted to double the wire around the said former and so as to bring the eyes into a longitudinal plane at right angles to the plane of the link, a vertically-swinging blade 51 in a position between the said two eyes, and a pair of reciprocating jaws 35 35, one each side of said blade and reciprocating in a plane at right angles to the plane of the eyes and the plane of said blade, the said jaws being adapted to force the said eyes together upon opposite sides of said blade, substantially as described.

7. In a machine for making wire chain, the combination of mechanism substantially such as described, adapted to bend the wire to form eyes in the blank, then to double the said wire around a former, bringing the eyes into position parallel with each other, an abutment 27, against which said eyes are presented in the doubling bend, the said abutment being adapted to receive an up-and-down movement, jaws 35 35, arranged to clamp the eyes against the respective sides of said abutment, and reciprocating bending-fingers 42 and 43, adapted to force the projecting ends of the wires inward in rear of the eyes, and mechanism substantially such as described to withdraw said abutment from between the eyes and whereby the said jaws 35 may operate to close the eyes together, substantially as described.

8. In a machine for making wire-chain, the combination of mechanism, substantially such as described, adapted to bend the wire to form eyes in the blank, then to double the said wire around a former, bringing the eyes into position parallel with each other, an abutment 27, against which said eyes are presented in the doubling bend, the said abutment being adapted to receive an up-and-down movement, jaws 35 35, arranged to clamp the eyes against the respective sides of said abutment, and reciprocating bending-fingers 42 and 43, adapted to force the projecting ends of the wires inward in rear of the eyes, mechanism substantially such as described, to withdraw said abutment from between the eyes and whereby the said jaws 35 may operate to close the eyes together, with mechanism substantially such as described to impart to said fingers a downward movement after they shall have made their inward movement, substantially as and for the purpose described.

9. In a machine for making wire-chain substantially such as described, the combination of mechanism adapted to form an eye in each end of the blank, a former, mechanism arranged to double the said blank around the said former, an abutment 27, arranged to move up and down in a plane parallel with the plane of said eyes, the said abutment constructed with a downwardly-projecting blade 51, with a pair of reciprocating jaws 35 35 arranged one each side of said abutment, the bending-fingers 42 and 43, with mechanism substantially such as described to impart an up-and-down movement to said abutment, whereby the said abutment is first presented between the eyes and jaws, and then on the upward movement of the abutment the said blade will be presented between the said eyes and jaws, the said jaws being adapted to force the said eyes together upon said blade, substantially as and for the purpose described.

10. In a machine for making chain, the combination of mechanisms substantially such as described, adapted to form an eye in each end of a blank, with bending devices arranged to double the said blank around the former and bring the eyes into planes parallel with each other, and a pair of reciprocating jaws 35, arranged to force the said eyes together around the former, substantially as described.

11. In a machine for making chain substantially such as described, the combination of a pair of spindles $a\ a$, vertically-reciprocating slide $i$, a former 18, benders 25 and 26, reciprocating jaws 35 35, and the centerer 54 on said slide, all substantially as described.

12. In a machine for making chain substantially such as described, the combination of the benders 25 and 26, and the former 18, the said benders provided on their working faces with cheek-pieces 81, substantially as and for the purpose described.

13. In a machine for making chain substantially such as described, the combination of the reciprocating jaws 35, the abutment 27, levers 32 and 33, fingers 42 and 43, hung to said levers, and the vertically-reciprocating slide $i$, substantially as and for the purpose described.

14. In a machine for bending wire for the links of chain, the combination of two spindles $a\ a$, the vertically-reciprocating slide $i$, and the hammer $v$, adapted to strike upon the said slide when in its down position, substantially as and for the purpose described.

15. In a machine for making wire chains such as described, the combination therewith of an intermittently-rotating wheel 58, the periphery of said wheel constructed with projecting prongs 68 and with shoulders 69 back of said prongs, with a reciprocating cutter 71 arranged to act in connection with said shoulder 69, substantially as and for the purpose described.

16. As a trimming device for the manufacture of chain substantially such as described, the combination of the wheel 58, mechanism for imparting thereto an intermittent rotative movement, the periphery of the wheel constructed with projecting prongs 68, adapted to engage succeeding links and also constructed with shoulders 69 in rear of said prongs, with a reciprocating cutter 71 arranged to work in connection with said shoulder 69 on the wheel, and a dog 77 in rear of said cutter, substantially as and for the purpose described.

17. As a trimming device for the manufacture of chain substantially such as described, the combination of the wheel 58, mechanism for imparting thereto an intermittent rotative movement, the periphery of the wheel constructed with projecting prongs 68, adapted to engage succeeding links and also constructed with shoulders 69 in rear of said prongs, and a reciprocating cutter 71, arranged to work in connection with said shoulder 69 on the wheel, the said wheel provided with notches 79, with a locking-dog 78, adapted to engage said notches as the said shoulders are successively presented to the said cutter, substantially as and for the purpose described.

In testimony whereof I have signed this specification in the presence of two subscribing witnesses.

RICHARD A. BREUL.

Witnesses:
JOHN E. EARLE,
LILLIAN D. KELSEY.